United States Patent
Yu

(10) Patent No.: US 11,522,986 B2
(45) Date of Patent: Dec. 6, 2022

(54) ELECTRONIC DEVICE INCLUDING CAMERA MODULE FOR TAKING IMAGE THROUGH AT LEAST ONE PORTION OF DISPLAY

(71) Applicant: Samsung Electronics Co., Ltd., Suwon-si (KR)

(72) Inventor: Youngbok Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 25 days.

(21) Appl. No.: 17/207,160

(22) Filed: Mar. 19, 2021

(65) Prior Publication Data

US 2021/0297515 A1 Sep. 23, 2021

(30) Foreign Application Priority Data

Mar. 19, 2020 (KR) ........................ 10-2020-0033946

(51) Int. Cl.
*H04N 5/225* (2006.01)
*H04M 1/02* (2006.01)

(52) U.S. Cl.
CPC ........ *H04M 1/0264* (2013.01); *H04N 5/2252* (2013.01); *H04N 5/2253* (2013.01); *H04N 5/22521* (2018.08)

(58) Field of Classification Search
None
See application file for complete search history.

(56) References Cited

U.S. PATENT DOCUMENTS

| | | | |
|---|---|---|---|
| 9,091,802 B2 * | 7/2015 | Lee | H04N 5/2253 |
| 9,813,602 B2 | 11/2017 | Ba-Tis et al. | |
| 10,581,233 B2 * | 3/2020 | Liu | H04N 5/2253 |
| 2014/0184891 A1 | 7/2014 | Lee et al. | |

(Continued)

FOREIGN PATENT DOCUMENTS

| | | |
|---|---|---|
| CN | 101533145 A | 9/2009 |
| JP | H05-203864 A | 8/1993 |

(Continued)

OTHER PUBLICATIONS

International Search Report and Written Opinion of the International Searching Authority dated Jul. 2, 2021, in connection with International Application No. PCT/KR2021/003364, 9 pages.

*Primary Examiner* — Gary C Vieaux

(57) ABSTRACT

Disclosed is an electronic device that includes a display and a camera module. The display includes a camera exposure area. The camera module is disposed on the camera exposure area and includes a housing. The camera module includes a lens housing that is fixed to the housing and at least one lens that is disposed in the lens housing and includes an optical axis facing toward the camera exposure area. The camera module includes a first printed circuit board that moves in the housing in an optical axis direction of the lens and an image sensor that faces the lens and that is mounted on the first printed circuit board. The camera module includes a second printed circuit board disposed on an opposite side to the image sensor. The camera module includes a connecting member disposed between the first and second printed circuit boards for transferring an electrical signal.

20 Claims, 16 Drawing Sheets

(56) References Cited

U.S. PATENT DOCUMENTS

2017/0289324 A1 10/2017 Yeo et al.
2019/0020822 A1 1/2019 Sharma et al.

FOREIGN PATENT DOCUMENTS

| KR | 10-2011-0011243 A | 2/2011 |
| KR | 10-2013-0055136 A | 5/2013 |
| KR | 10-2018-0033701 A | 4/2018 |

* cited by examiner

ELECTRONIC DEVICE INCLUDING CAMERA MODULE FOR TAKING IMAGE THROUGH AT LEAST ONE PORTION OF DISPLAY

CROSS-REFERENCE TO RELATED APPLICATION

This application is based on and claims priority under 35 U.S.C. § 119 to Korean Patent Application No. 10-2020-0033946 filed on Mar. 19, 2020 in the Korean Intellectual Property Office, the disclosure of which is incorporated by reference herein its entirety.

BACKGROUND

1. Field

The disclosure relates to an electronic device including a camera module for taking an image through at least one portion of a display.

2. Description of Related Art

To provide a wider screen, a portable electronic device, such as a smartphone or a tablet PC, has a minimized bezel area and an increased display area. An image sensor for implementing a camera (e.g., a camera module), an illuminance sensor for sensing illuminance, a fingerprint recognition sensor for fingerprint verification, and the like, together with a display device (e.g., a display), may be disposed on a front surface of the portable electronic device such as a smartphone or a tablet PC.

The above information is presented as background information only to assist with an understanding of the disclosure. No determination has been made, and no assertion is made, as to whether any of the above might be applicable as prior art with regard to the disclosure.

SUMMARY

In the electronic device, to increase the display area, the image sensor (e.g., a camera module) may be disposed to at least partially overlap the display device (e.g., a display) in an up/down direction. In this case, to maintain an angle of view of a lens of the camera module, a camera exposure area may be used for the display device, and in a case where the lens is moved to support an auto focus function, a camera exposure area having a predetermined size or more may be used.

Aspects of the disclosure are to address at least the above-mentioned problems and/or disadvantages and to provide at least the advantages described below. Accordingly, an aspect of the disclosure is to provide an electronic device including a camera module (e.g., a front camera) for taking an image through a portion of a display.

Another aspect of the disclosure is to provide an electronic device in which a lens of a camera module is fixed in a camera exposure area of a display that at least partially overlaps the camera module in an up/down direction and an image sensor is moved for auto focusing.

In accordance with an aspect of the disclosure, an electronic device includes a display including a camera exposure area and a camera module disposed on the camera exposure area. The camera module includes a housing fixed to the camera exposure area, a lens housing that is fixed to the housing and that includes an opening corresponding to the camera exposure area, at least one lens that is disposed in the lens housing and that has an optical axis facing toward the camera exposure area, a first printed circuit board that moves in the housing in an optical axis direction of the lens, an image sensor that faces the lens and that is mounted on one surface of the first printed circuit board, a second printed circuit board fixed to the housing and disposed on an opposite side to the image sensor with respect to the first printed circuit board, and a connecting member that is disposed between the first printed circuit board and the second printed circuit board and that transfers an electrical signal between the first printed circuit board and the second printed circuit board, the connecting member being deformed as the first printed circuit board moves.

In accordance with another aspect of the disclosure, an electronic device includes a display including a camera exposure area, a camera module disposed on the camera exposure area, and a processor operatively connected with the display and the camera module. The camera module includes at least one lens having an optical axis corresponding to the center of the camera exposure area, a first printed circuit board that linearly moves in the housing in an optical axis direction of the lens, an image sensor disposed between the lens and the first printed circuit board and electrically connected with the first printed circuit board, a second printed circuit board disposed on an opposite side to the image sensor with respect to the first printed circuit board and electrically connected with the processor, and a connecting member that transfers an electrical signal between the first printed circuit board and the second printed circuit board and that is deformed as the first printed circuit board moves. The processor is configured to move the first printed circuit board and the image sensor for auto focusing of the image sensor.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

In the following description made with respect to the accompanying drawings, similar components will be assigned with similar reference numerals.

DETAILED DESCRIPTION

FIGS. 1A through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1A:
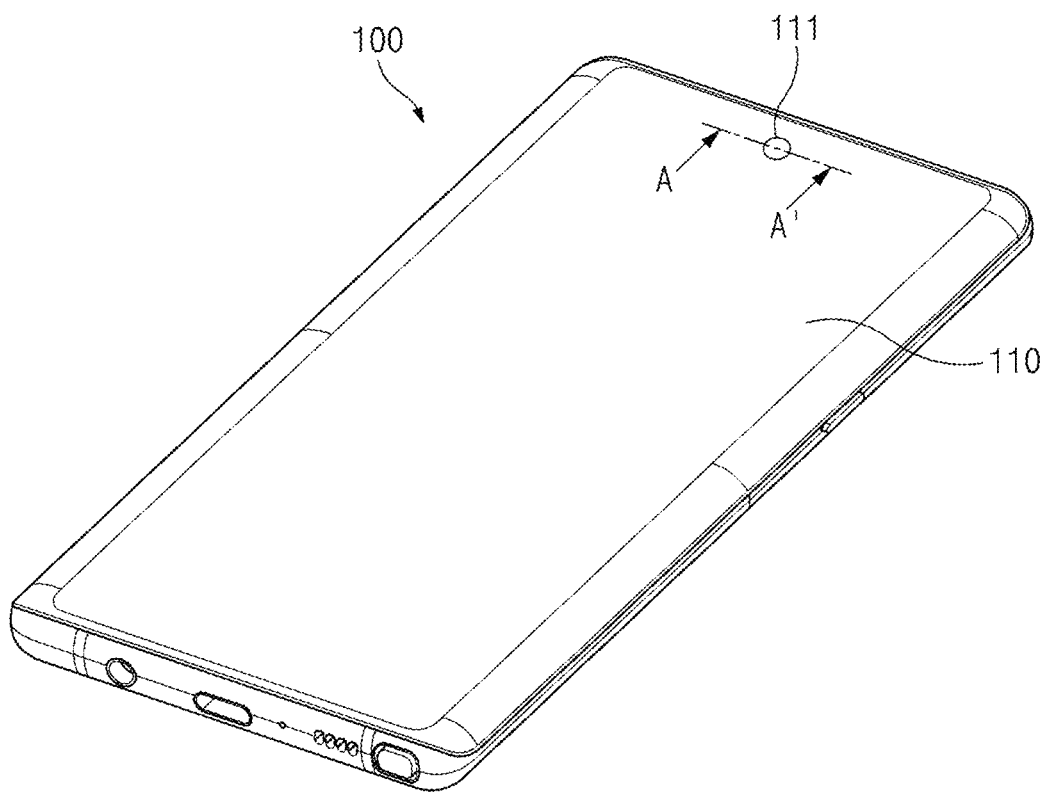
FIG. 1A is a view illustrating an electronic device according to an embodiment.
Figure 1B:
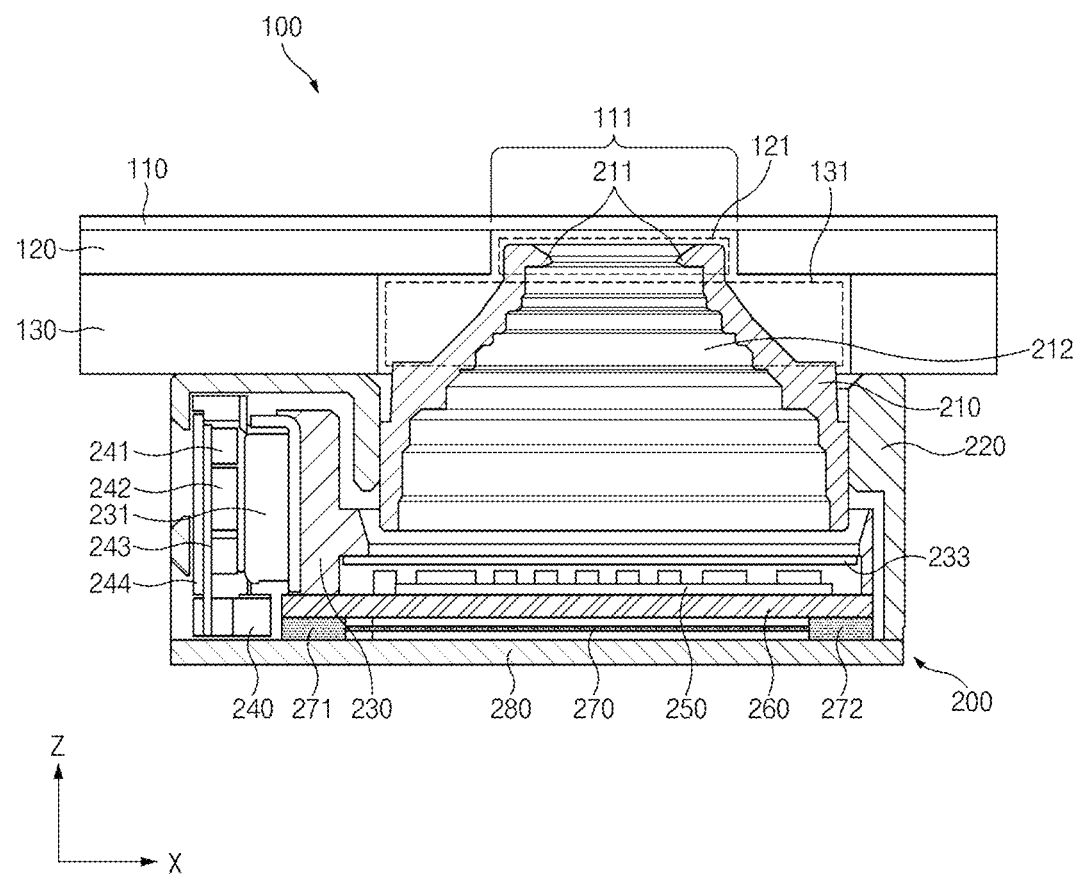
FIG. 1B illustrates a sectional view taken along line A-A' of FIG. 1A.
Figure 2:
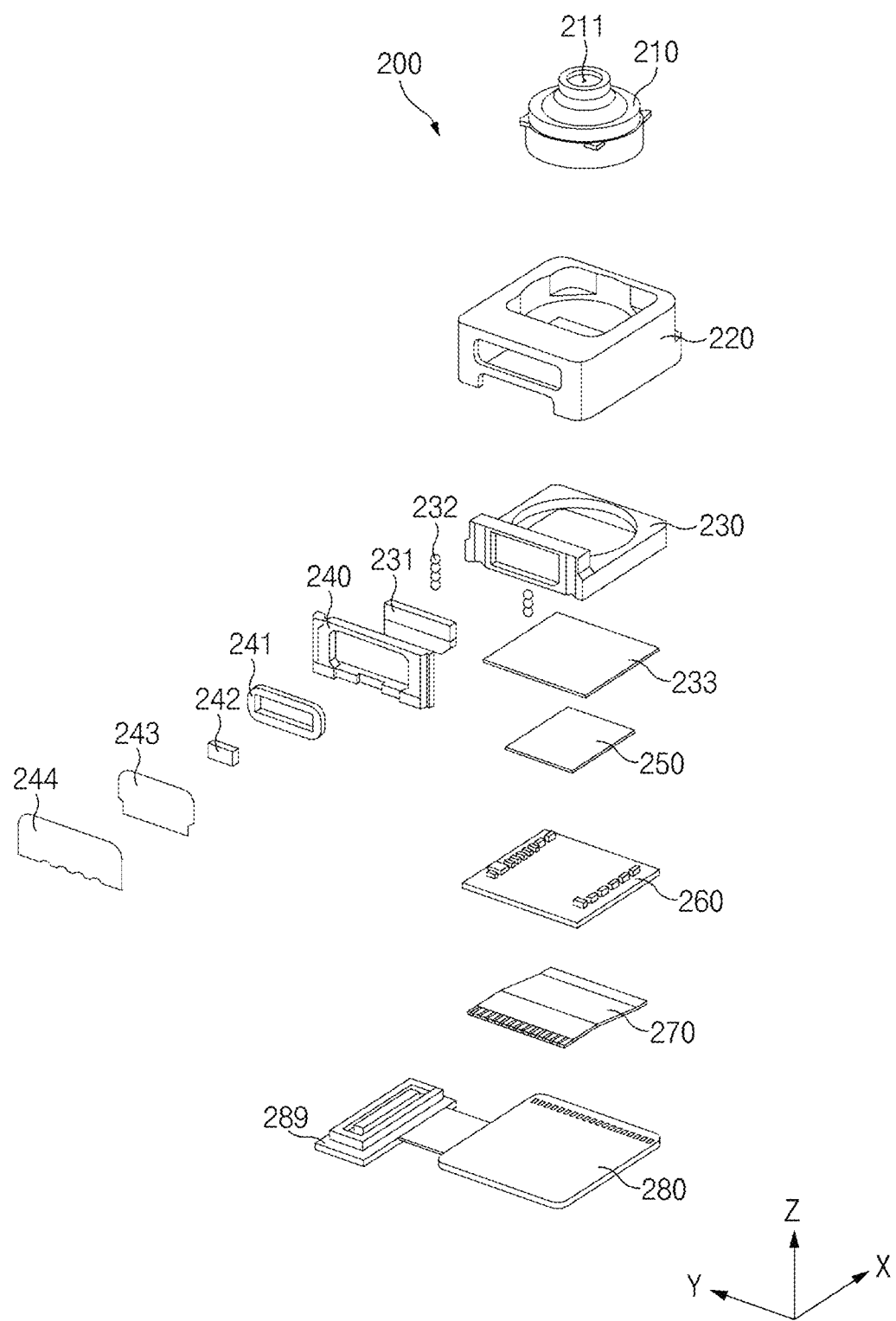
FIG. 2 is an exploded perspective view illustrating a camera module of FIG. 1B.
Figure 3:
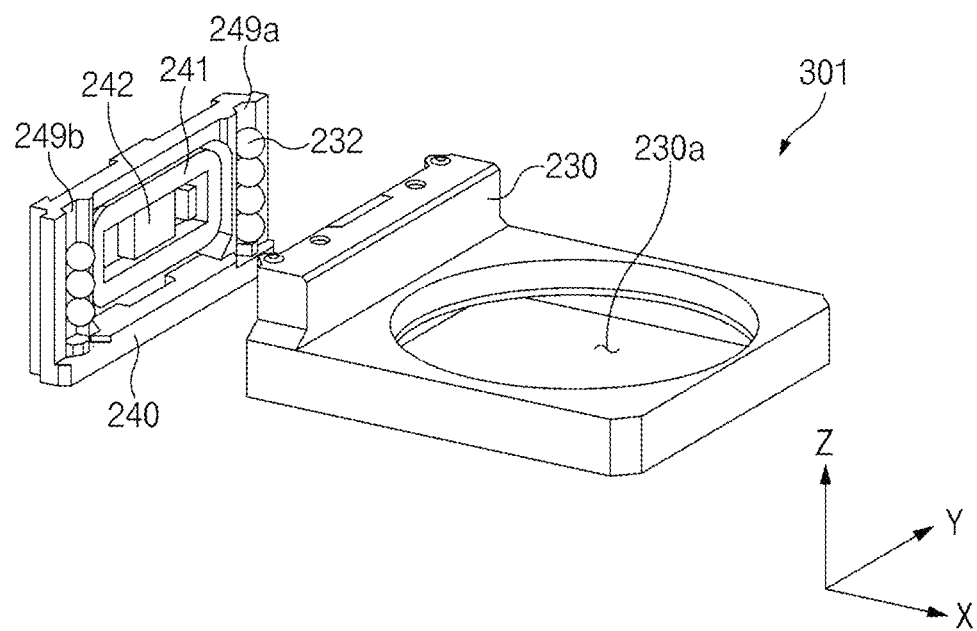
FIG. 3 illustrates exploded perspective views of a carrier of FIG. 2.
Figure 3:
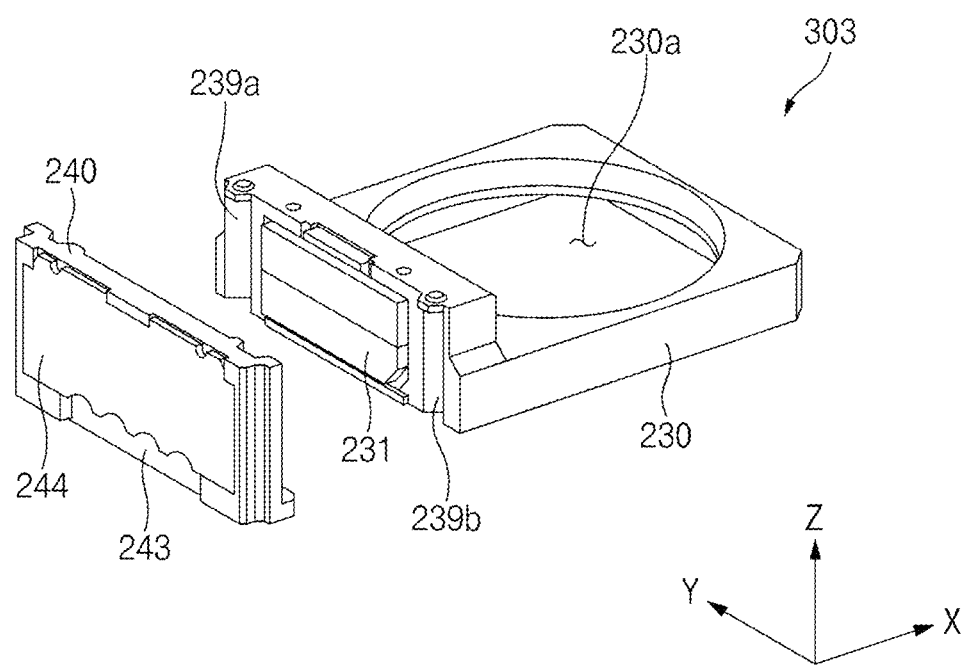

FIG. 1A is a view illustrating an electronic device according to an embodiment. FIG. 1B illustrates a sectional view taken along line A-A' of FIG. 1A. FIG. 2 is an exploded perspective view illustrating a camera module of FIG. 1B. FIG. 3 illustrates exploded perspective views of a carrier of FIG. 2. In FIG. 3, view 301 illustrates the carrier 230 and a second housing 240 viewed from one point of view, and view 303 illustrates the carrier 230 and the second housing 240 viewed from another point of view.

Referring to FIGS. 1A and 1B, the electronic device 100 according to the embodiment may include a housing that includes a first surface (or, a front surface), a second surface (or, a rear surface), and side surfaces surrounding a space between the first surface and the second surface. According to an embodiment, the first surface may be formed by a first plate (or, a front plate) 110 (e.g., a glass plate including various coating layers or a polymer plate), at least part of which is substantially transparent. The second surface may be formed by a second plate (or, a back plate) that is substantially opaque. The second plate may be formed of, for example, coated or colored glass, ceramic, polymer, metal (e.g., aluminum, stainless steel (STS), or magnesium), or a combination of at least two of the aforementioned materials. The side surfaces may be formed by a side bezel structure (or, a side member) that is coupled with the first plate 110 and the second plate and that contains metal and/or polymer. In some embodiments, the back plate and the side bezel structure may be integrally formed with each other and may contain the same material (e.g., a metallic material such as aluminum).

According to an embodiment, the electronic device 100 may include a support member 130 therein. For example, the support member 130 may be disposed in the electronic device 100 and may be connected with the side bezel structure, or may be integrally formed with the side bezel structure. The support member 130 may be formed of, for example, a metallic material and/or a nonmetallic (e.g., polymer) material. A display 120 may be coupled to one surface of the support member 130, and a printed circuit board may be coupled to an opposite surface of the support member 130. The printed circuit board may have a processor, a memory, and/or an interface mounted thereon. The processor may include, for example, one or more of a central processing unit, an application processor, a graphic processing unit, an image signal processor, a sensor hub processor, or a communication processor. The memory may include, for example, a volatile memory or a nonvolatile memory. The interface may include, for example, a high definition multimedia interface (HDMI), a universal serial bus (USB) interface, an SD card interface, and/or an audio interface. The interface, for example, may electrically or physically connect the electronic device 100 with an external electronic device and may include a USB connector, an SD card/MMC connector, or an audio connector.

According to an embodiment, the electronic device 100 may include the display 120. For example, the display 120 may be coupled to the one surface of the support member 130 and may be disposed between the first plate 110 and the support member 130. The first plate 110 may include a camera exposure area 111 formed in a position corresponding to the camera module 200 when the first plate 110 is viewed in the Z-axis direction. The display 120 may include a first through-hole 121 corresponding to the camera exposure area 111. The support member 130 may include a second through-hole 131, at least part of which overlaps the first through-hole 121. For example, one portion of a lens housing 210 of the camera module 200 may be disposed in the first through-hole 121. Another portion of the lens housing 210 of the camera module 200 may be disposed in the second through-hole 131. In another example (not illustrated), the first through-hole 121 may be filled with a transparent material and may form an optical hole. An opening 211 of the camera module 200 may be disposed to overlap the optical hole when the first plate 110 is viewed in the Z-axis direction.

Referring to FIGS. 1B, 2, and 3, the camera module 200 may include the lens housing 210, at least one lens 212, a first housing 220, the carrier 230, the second housing 240, an image sensor 250, a first printed circuit board 260, a connecting member 270, or a second printed circuit board 280.

According an embodiment, the lens 212 may collect light incident from the outside and may deliver the collected light to the image sensor 250 disposed under the lens housing 210. For example, the lens 212 may be constituted by one or more lenses. The lens 212 may be disposed in the lens housing 210 so as to have an optical axis in a specified direction (e.g., the Z-axis direction). The lens 212 may be disposed in a position corresponding to the camera exposure area 111. The lens housing 210 may surround the lens 212 mounted therein and may provide an optical path along which light incident through the lens 212 is delivered to the image sensor 250. In this regard, the lens housing 210 may have a hollow area in the center thereof and may be open at the bottom to expose the image sensor 250. The lens housing 210 may have, in the top thereof, the opening 211 corresponding to the shape of the lens 212.

According to an embodiment, the lens housing 210 may be coupled (or, fixed) to the first housing 220. The first housing 220 may be coupled (or, fixed) to the support member 130 to correspond to the second through-hole 131 of the support member 130.

According to an embodiment, the carrier 230 may be disposed in the first housing 220. For example, the carrier 230 may have a hollow area in the center thereof and may be open at the top and the bottom to expose the image sensor 250. The carrier 230 may linearly move in the specified direction (e.g., the Z-axis direction) in the first housing 220. The carrier 230 may include an opening 230a formed in the specified direction (e.g., the Z-axis direction). The first printed circuit board 260, when viewed in the specified direction (e.g., the Z-axis direction), may be coupled to the carrier 230 so as to overlap the opening 230a of the carrier 230. The image sensor 250 may be disposed between the carrier 230 and the first printed circuit board 260. The image sensor 250 may be mounted on one surface of the first printed circuit board 260. The image sensor 250 may be disposed to correspond to the optical axis (e.g., the Z-axis) of the lens 212. The second printed circuit board 280 may be coupled to one surface of the first housing 220.

According to an embodiment, the connecting member 270 may be disposed between the first printed circuit board 260 and the second printed circuit board 280. For example, the connecting member 270 may include first contact terminals on at least part of a first surface thereof (e.g., one surface facing the first printed circuit board 260). The connecting member 270 may include second contact terminals on at least part of a second surface thereof (e.g., an opposite surface facing the second printed circuit board 280). The first contact terminals may be connected with third contact terminals formed on the first printed circuit board 260. The second contact terminals may be connected with fourth contact terminals formed on the second printed circuit board 280. One of the first contact terminals may be connected with one of the second contact terminals through the inside of the connecting member 270. For example, the connecting member 270 may include a flexible printed circuit board (FPCB). In another example, the connecting member 270 may include a plurality of spring structures.

According to an embodiment, image data obtained by the image sensor 250 may be transferred to a processor (e.g., a processor 1020 of FIG. 10 to be described below) that is operatively connected with the camera module 200. For example, a connector 289 may be operatively connected with the processor. The image data may be transferred to the processor through the first printed circuit board 260, the connecting member 270, the second printed circuit board 280, and the connector 289.

According to an embodiment, the carrier 230 may have a magnet member 231 (e.g., a magnet member for auto focusing (AF)) disposed on one outside portion thereof (e.g., an outside portion viewed in the X-axis direction). The magnet member 231 may be operated in a state of being paired with a coil 241 disposed in the second housing 240. For example, the second housing 240 may be coupled (or, fixed) to one inside portion (e.g., an inside portion viewed in the X-axis direction) of the first housing 220. A coil substrate 243 may be coupled (or, fixed) to the second housing 240 in a direction (e.g., the X-axis direction) toward the magnet member 231. For example, the coil substrate 243 may include a printed circuit board or an FPCB. The coil 241 may be mounted on the coil substrate 243 to face the magnet member 231. The coil substrate 243 may be operatively connected with the processor. The coil substrate 243 may supply a signal (e.g., current) received from the processor to the coil 241. A magnetic field may be formed around the coil 241 based on the signal, and the magnet member 231 may move in the specified direction (e.g., the Z-axis direction) based on the magnetic field. The processor may control the movement of the magnet member 231 by controlling the magnitude and direction of the signal. The carrier 230 may move together with the magnet member 231, and the first printed circuit board 260 and the image sensor 250 may move in the specified direction (e.g., the Z-axis direction) as the carrier 230 moves. According to various embodiments, the second housing 240 may be integrally formed with the first housing 220.

According to an embodiment, a Hall sensor 242 may be disposed between the coil substrate 243 and the magnet member 231. For example, the Hall sensor 242 may be mounted on the coil substrate 243 to face the magnet member 231. The coil substrate 243 may receive a sensed value from the Hall sensor 242 and may transfer the sensed value to the processor. The processor may control (or, change) a signal supplied to the coil 241, based on the sensed value.

According to an embodiment, the image sensor 250 may linearly move across a specified section in the Z-axis direction under the control of the processor. For example, a magnetic field generated by the coil 241 may be determined by a signal received from the processor, and the magnet member 231 may linearly move in the Z-axis direction based on the magnetic field. The carrier 230 may linearly move together with the magnet member 231, and the first printed circuit board 260 coupled to the carrier 230 and the image sensor 250 coupled to the first printed circuit board 260 may linearly move in the Z-axis direction. For example, the processor may linearly move the image sensor 250 in the Z-axis direction for auto focusing (AF).

According to an embodiment, the shape of the connecting member 270 may be changed as the first printed circuit board 260 moves. For example, a first edge 271 of the connecting member 270 may be coupled to the first printed circuit board 260. A second edge 272 of the connecting member 270 that is not adjacent to (or, is parallel to) the first edge 271 may be coupled to the second printed circuit board 280. For example, when the image sensor 250 closely approaches the lens housing 210, the first printed circuit board 260, the connecting member 270, and the second printed circuit board 280 may form a "Z" shape (or, an inverted "Z" shape).

According to an embodiment, the carrier 230 may include, on one sidewall thereof (e.g., a sidewall on which the magnet member 231 is disposed), one or more guide grooves 239a and 239b that guide and support a movement of the carrier 230. The second housing 240 may include, on one side surface thereof (e.g., a side surface facing the magnet member 231), one or more guide grooves 249a and 249b that guide and support the movement of the carrier 230. For example, the guide grooves 239a, 239b, 249a, and 249b may extend along the specified direction (e.g., the Z-axis direction) and may have a V-shaped cross-section. The guide grooves 239a and 239b of the carrier 230 may be formed in positions corresponding to the guide grooves 249a and 249b of the second housing 240. One or more guide balls 232 may be disposed between the guide grooves 239a and 239b of the carrier 230 and the guide grooves 249a and 249b of the second housing 240. When the carrier 230 moves along the specified direction (e.g., the Z-axis direction), the guide balls 232 may perform a rolling motion between the guide grooves 239a, 239b, 249a, and 249b. For example, the guide grooves 239a, 239b, 249a, and 249b may limit a movement of the carrier 230 in the first housing 220 in a direction other than the specified direction (e.g., the Z-axis direction).

According to an embodiment, a yoke 244 may be disposed on one surface of the second housing 240 so as to face the coil substrate 243. For example, the coil 241 may be disposed between the yoke 244 and the magnet member 231. The yoke 244 may concentrate an electromagnetic force of the coil 241 on the magnet member 231 to improve efficiency of the coil 241. Furthermore, the carrier 230 may be brought into close contact with the second housing 240 by an attractive force between the magnet member 231 and the yoke 244. Accordingly, the guide balls 232 may not be separated from the guide grooves 239a, 239b, 249a, and 249b, and the carrier 230 may smoothly linearly move in the specified direction (e.g., the Z-axis direction).

According to an embodiment, an infrared filter 233 may be disposed between the lens housing 210 and the image sensor 250. For example, the infrared filter 233 may filter an infrared region from light incident through the lens 212. For example, the infrared filter 233 may be attached to an area around the opening 230a of the carrier 230. In another example, the infrared filter 233 may be attached to a lower end portion of the lens housing 210.

As described above, the electronic device 100 may include the camera module 200 disposed to overlap one portion (e.g., the camera exposure area 111) of the display 120. To reduce the size of the camera exposure area 111, the camera module 200 is disposed as close as possible to the display 120. When the lens housing 210 moves in the specified direction (e.g., the Z-axis direction) for auto focusing (AF), the camera exposure area 111 may be formed to be larger in consideration of the angle of view of the lens 212 than when the lens housing 210 is fixed. The camera module 200 disclosed herein may move the image sensor 250 in the specified direction (e.g., the Z-axis direction) in a state in which the lens housing 210 is fixed, and the size of the camera exposure area 111 may be reduced based on the angle of view of the lens 212.

Figure 4:
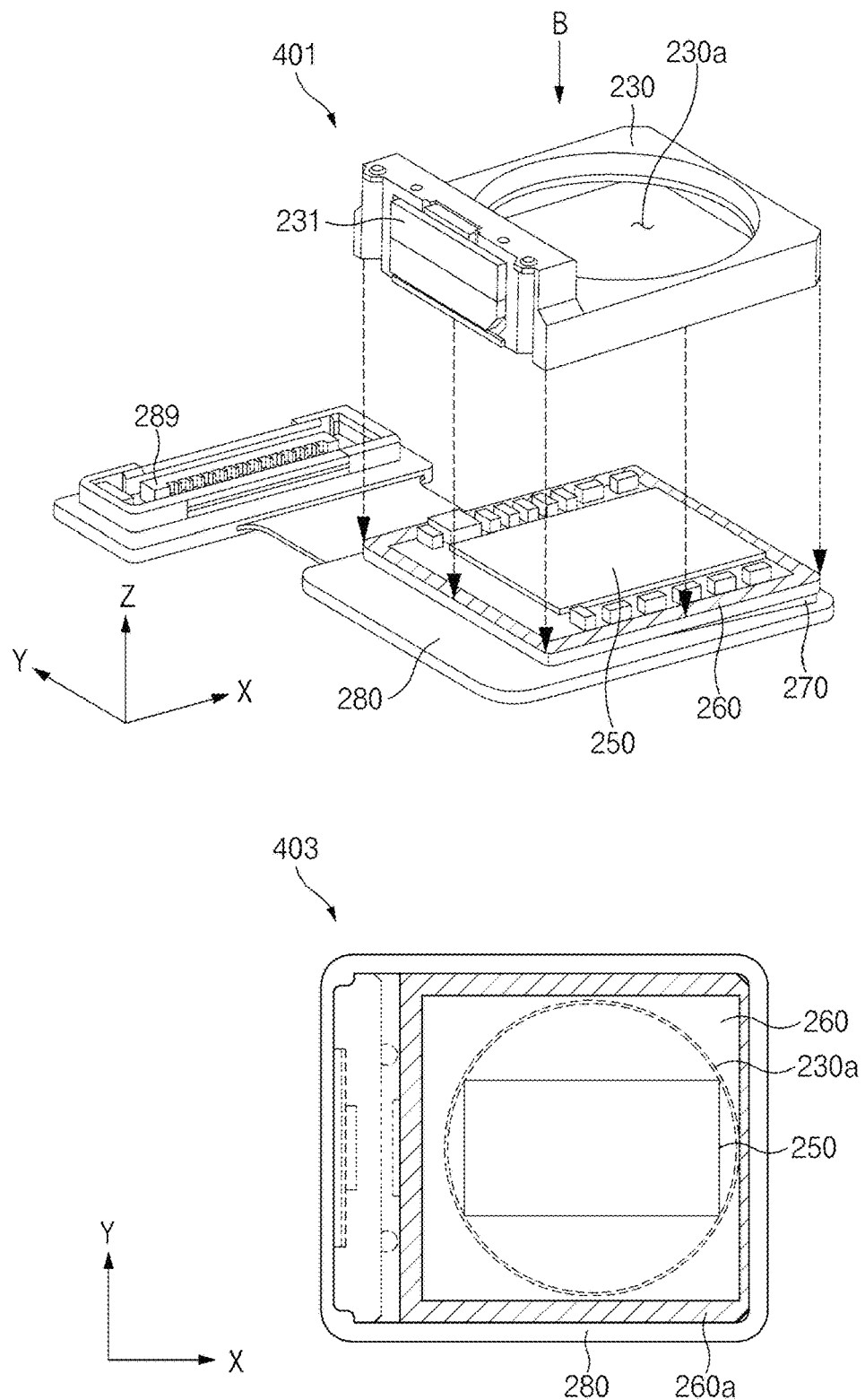
FIG. 4 illustrates a coupling relationship between the carrier and a first printed circuit board of FIG. 2.

FIG. 4 illustrates a coupling relationship between the carrier and the first printed circuit board of FIG. 2.

Referring to FIG. 4, a perspective view 401 and a plan view 403 are illustrated. The perspective view 401 includes the carrier 230, the first printed circuit board 260, the connecting member 270, and the second printed circuit board 280. The plan view 403 is a view of the perspective view 401 in a direction B.

According to an embodiment, the carrier 230 and the first printed circuit board 260 may be coupled in a coupling area 260a of the first printed circuit board 260. For example, the coupling area 260a may be formed along the periphery of the first printed circuit board 260. For example, the carrier 230 may be attached to the coupling area 260a through an adhesive member. The opening 230a of the carrier 230 may be disposed to overlap the image sensor 250 in the Z-axis direction. The carrier 230 may be disposed on the first printed circuit board 260 such that the opening 230a of the carrier 230 overlaps the remaining area of the first printed circuit board 260 other than the coupling area 260a in the Z-axis direction.

Figure 5:
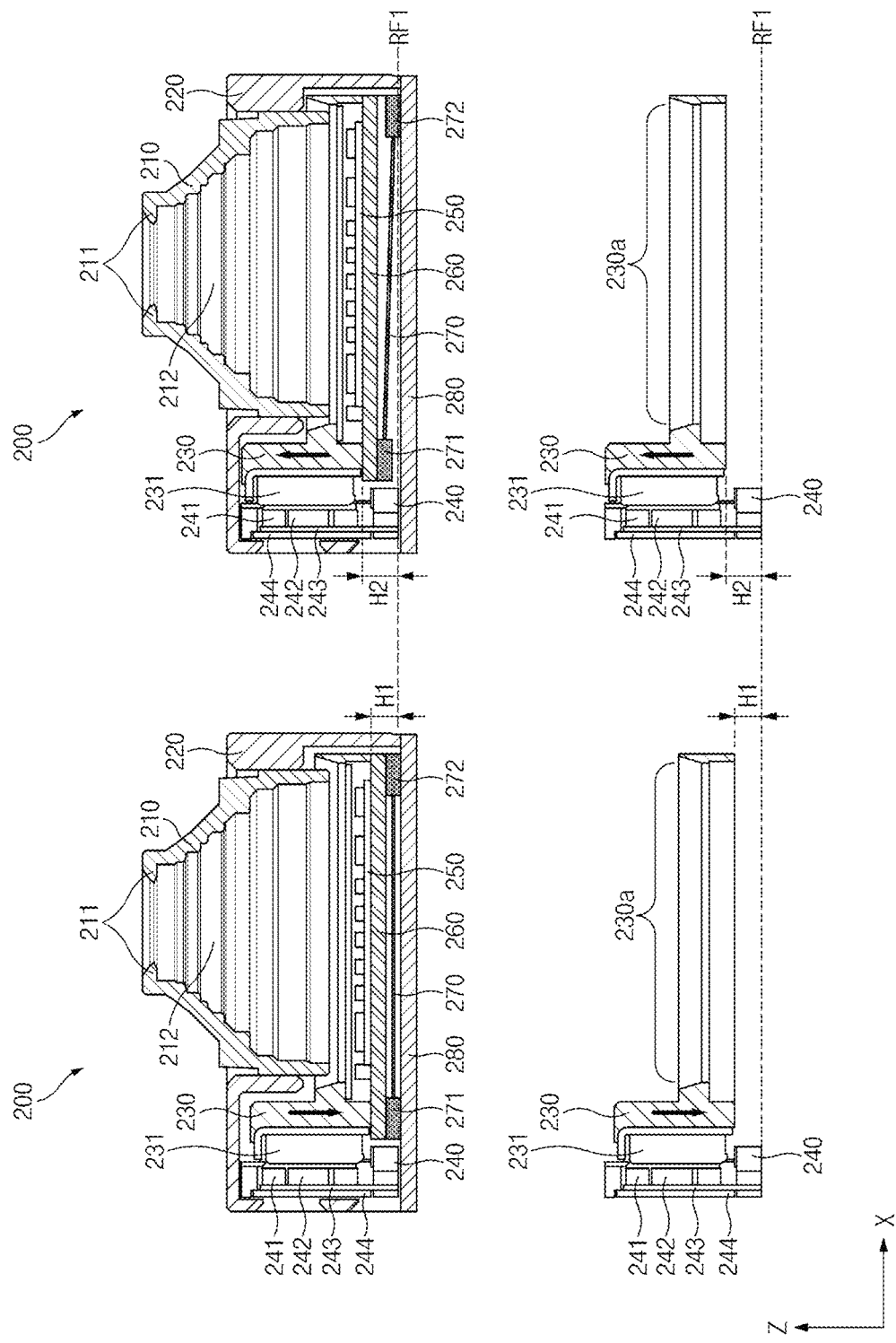
FIG. 5 is a view illustrating an operation of an image sensor by the carrier according to an embodiment.

FIG. 5 is a view illustrating an operation of the image sensor by the carrier according to an embodiment.

Referring to FIG. 5, the image sensor 250 may linearly move across the specified section in the specified direction (e.g., the Z-axis direction) in the first housing 220. For example, the processor (e.g., the processor 1020 of FIG. 10 to be described below) may supply a signal (e.g., current) to the coil 241. A magnetic field may be formed around the coil 241 based on the signal, and the magnet member 231 may move in the specified direction (e.g., the Z-axis direction) based on the magnetic field. The processor may control the movement of the magnet member 231 by controlling the magnitude and direction of the signal. The carrier 230 may move together with the magnet member 231, and the first printed circuit board 260 and the image sensor 250 may reciprocate in the specified direction (e.g., the Z-axis direction) as the carrier 230 moves.

According to an embodiment, under the control of the processor, the image sensor 250 may be moved to a first position in the direction opposite to the Z-axis direction, where the first position is a position spaced apart from the second printed circuit board 280 by a first distance H1. Under the control of the processor, the image sensor 250 may be moved to a second position in the Z-axis direction, where the second position is a position spaced apart from the second printed circuit board 280 by a second distance H2. The image sensor 250 may be moved to a specified position between the first position and the second position under the control of the processor.

Figure 6A:
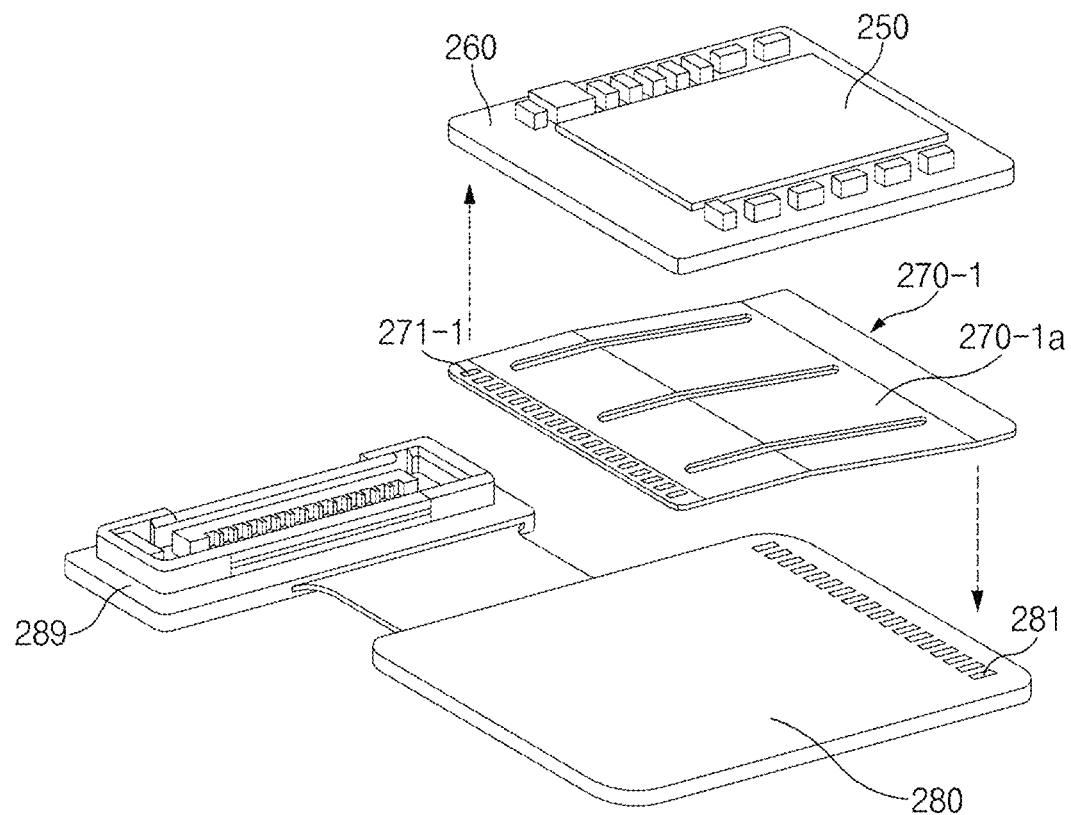
FIG. 6A is a view illustrating a coupling relationship between a connecting member and printed circuit boards according to an embodiment, as viewed in one direction.
Figure 6B:
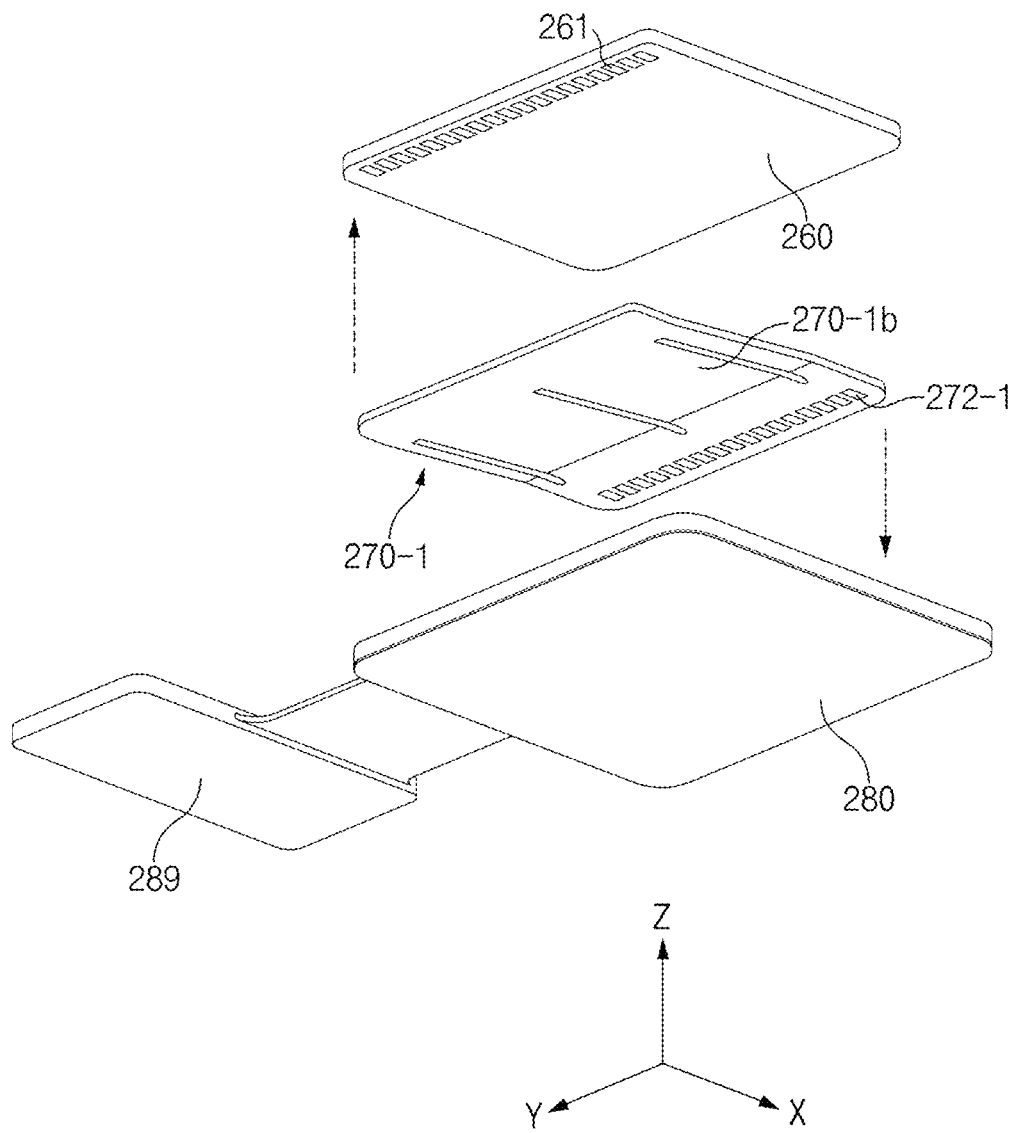
FIG. 6B is a view illustrating the coupling relationship between the connecting member and the printed circuit boards according to the embodiment, as viewed in a different direction.
Figure 6C:
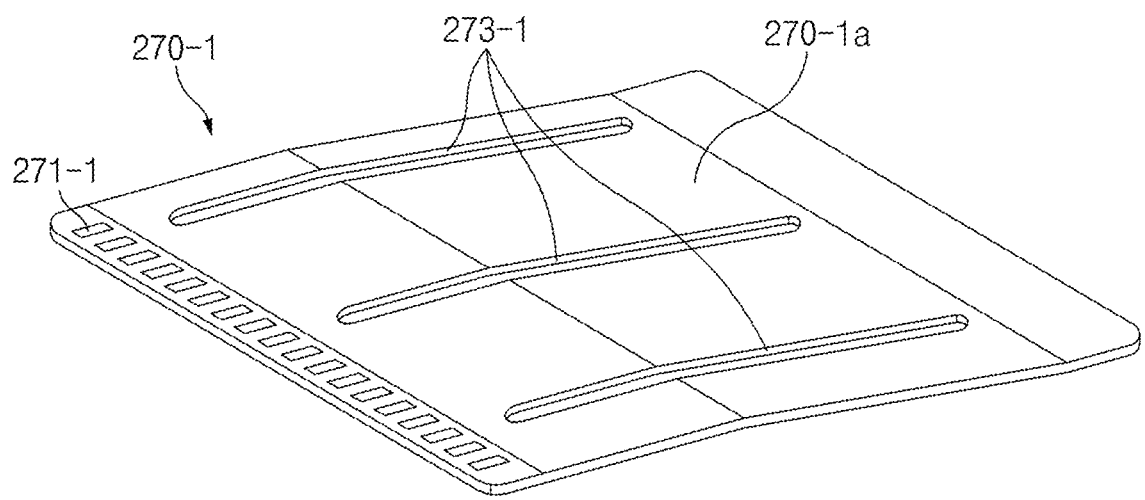
FIG. 6C is a view illustrating the connecting member of FIG. 6A or 6B.

FIG. 6A is a view illustrating a coupling relationship between a connecting member and printed circuit boards according to an embodiment, as viewed in one direction. FIG. 6B is a view illustrating the coupling relationship between the connecting member and the printed circuit boards according to the embodiment, as viewed in a different direction. FIG. 6C is a view illustrating the connecting member of FIG. 6A or 6B.

According to an embodiment, a first connecting member 270-1 (e.g., the connecting member 270 of FIG. 2) may be implemented with an FPCB. For example, a first surface 270-1a of the first connecting member 270-1 may be disposed to face the first printed circuit board 260. The first connecting member 270-1 may include first contact terminals 271-1 on at least part of the first surface 270-1a thereof. A second surface 270-1b of the first connecting member 270-1 may be disposed to face the second printed circuit board 280. The first connecting member 270-1 may include second contact terminals 272-1 on at least part of the second surface 270-1b thereof. Each of the first contact terminals 271-1 may be connected with a corresponding one of the second contact terminals 272-1. For example, inside the first connecting member 270-1, the first contact terminals 271-1 may be individually connected with the second contact terminals 272-1. According to an embodiment, the first contact terminals 271-1 may be spaced apart from the second contact terminals 272-1 by a specified distance (e.g., the length of one side of the first connecting member 270-1).

According to an embodiment, the first connecting member 270-1 may be electrically connected with the first printed circuit board 260. For example, the first printed circuit board 260 may include third contact terminals 261 on one surface thereof that faces the first connecting member 270-1. For example, when viewed in the Z-axis direction, the third contact terminals 261 may be disposed to overlap the first contact terminals 271-1. The third contact terminals 261 may be electrically connected with the first contact terminals 271-1. For example, the third contact terminals 261 may be individually brought into contact with the first contact terminals 271-1. The third contact terminals 261 may be electrically connected with the image sensor 250.

According to an embodiment, the first connecting member 270-1 may be electrically connected with the second printed circuit board 280. For example, the second printed circuit board 280 may include fourth contact terminals 281 on one surface thereof that faces the first connecting member 270-1. For example, when viewed in the Z-axis direction, the fourth contact terminals 281 may be disposed to overlap the second contact terminals 272-1. The fourth contact terminals 281 may be electrically connected with the second contact terminals 272-1. For example, the fourth contact terminals 281 may be individually brought into contact with the second contact terminals 272-1. The fourth contact terminals 281 may be electrically connected with the connector 289.

According to an embodiment, when the first printed circuit board 260 performs a linear motion in the specified direction (e.g., the Z-axis direction), the first connecting member 270-1 may maintain the flexibility and elasticity thereof. When the first printed circuit board 260 moves, the first connecting member 270-1 may be deformed, but may transfer a signal between the first printed circuit board 260 and the second printed circuit board 280. For example, when the first printed circuit board 260 moves away from the second printed circuit board 280, the first printed circuit board 260, the first connecting member 270-1, and the second printed circuit board 280 may form a "Z" shape (or, an inverted "Z" shape).

According to an embodiment, the first connecting member 270-1 may include at least one perforation 273-1. For example, the perforation 273-1 may extend in a direction from the first contact terminals 271-1 to the second contact terminals 272-1. The perforation 273-1 may improve the flexibility of the first connecting member 270-1 when the first connecting member 270-1 is deformed.

Figure 7A:
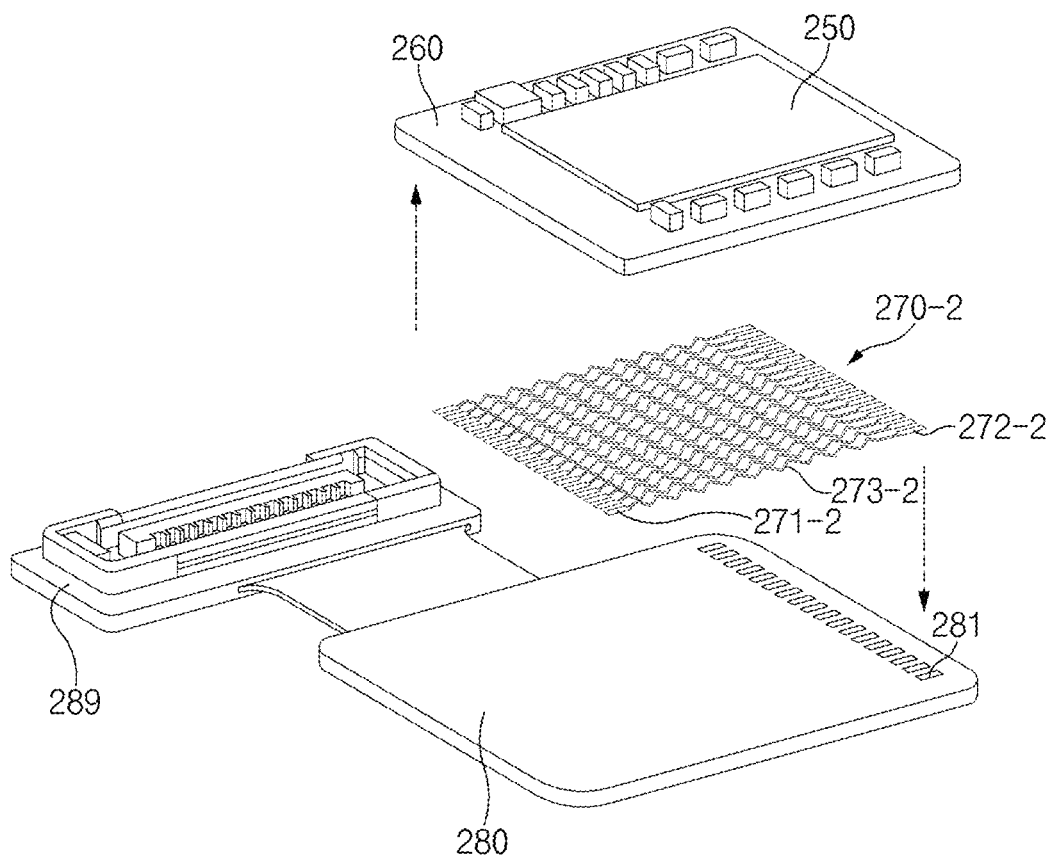
FIG. 7A is a view illustrating a coupling relationship between a connecting member and printed circuit boards according to various embodiments, as viewed in one direction.
Figure 7B:
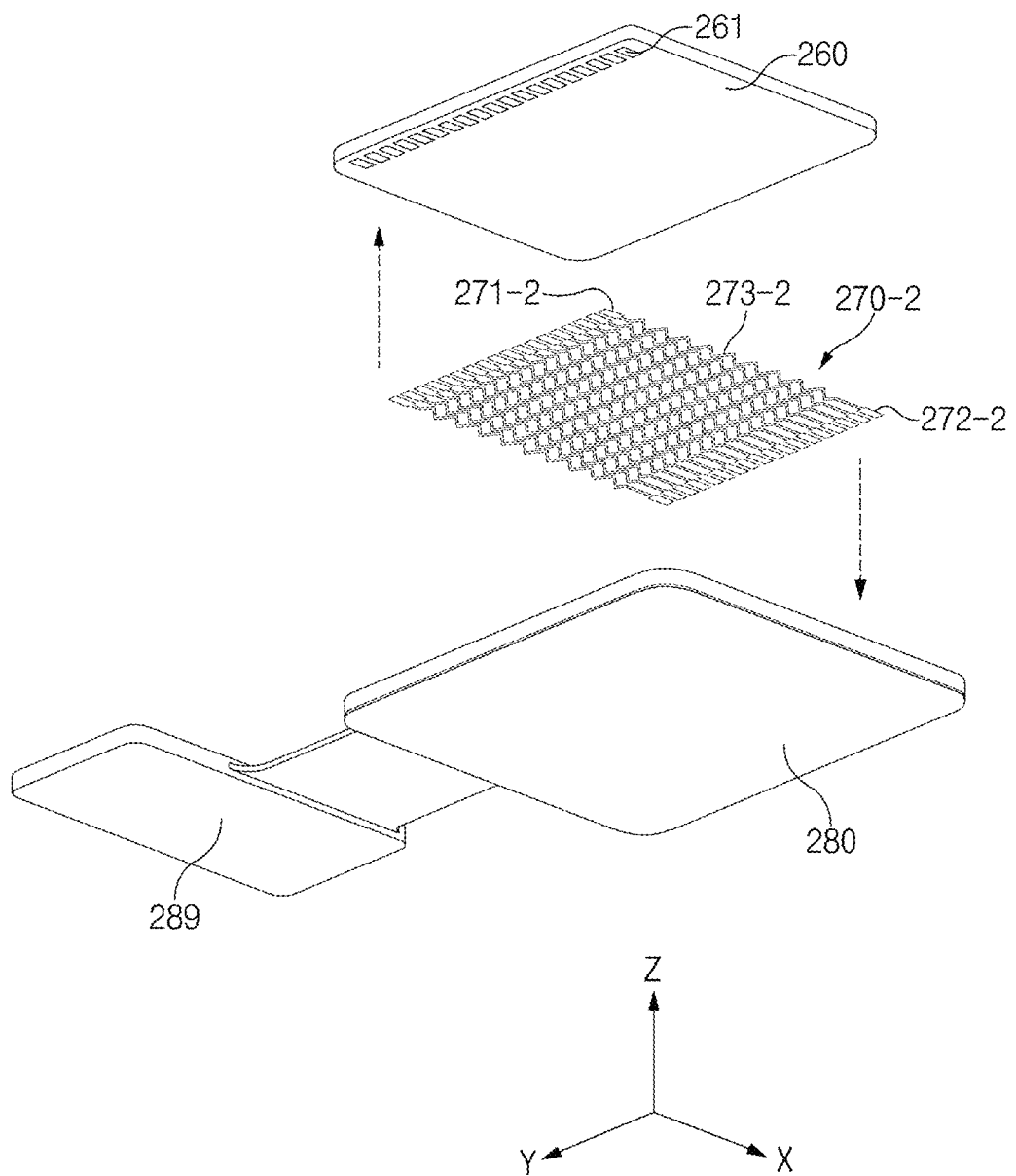
FIG. 7B is a view illustrating the coupling relationship between the connecting member and the printed circuit boards according to the various embodiments, as viewed in a different direction.
Figure 7C:
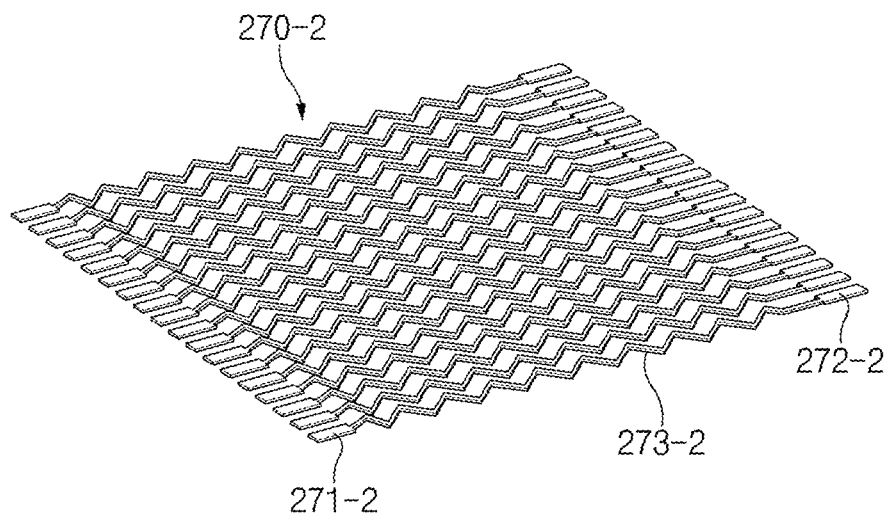
FIG. 7C is a view illustrating the connecting member of FIG. 7A or 7B.

FIG. 7A is a view illustrating a coupling relationship between a connecting member and printed circuit boards according to various embodiments, as viewed in one direction. FIG. 7B is a view illustrating the coupling relationship between the connecting member and the printed circuit boards according to the various embodiments, as viewed in a different direction. FIG. 7C is a view illustrating the connecting member of FIG. 7A or 7B.

According to an embodiment, a second connecting member 270-2 (e.g., the connecting member 270 of FIG. 2) may be implemented with a plurality of spring structures. For example, each of the plurality of spring structures may include a first contact terminal 271-2, a spring body 273-2, and a second contact terminal 272-2. The spring body 273-2 may connect the first contact terminal 271-2 and the second contact terminal 272-2 and may have flexibility and elasticity.

According to an embodiment, the second connecting member 270-2 may be electrically connected with the first printed circuit board 260. For example, the first printed circuit board 260 may include third contact terminals 261 on one surface thereof that faces the second connecting member 270-2. For example, when viewed in the Z-axis direction, the third contact terminals 261 may be disposed to overlap the first contact terminals 271-2 of the plurality of spring structures. The third contact terminals 261 may be electrically connected with the first contact terminals 271-2. For example, the third contact terminals 261 may be individually brought into contact with the first contact terminals 271-2. The third contact terminals 261 may be electrically connected with the image sensor 250.

According to an embodiment, the second connecting member 270-2 may be electrically connected with the second printed circuit board 280. For example, the second printed circuit board 280 may include fourth contact terminals 281 on one surface thereof that faces the second connecting member 270-2. For example, when viewed in the Z-axis direction, the fourth contact terminals 281 may be disposed to overlap the second contact terminals 272-2 of the plurality of spring structures. The fourth contact terminals 281 may be electrically connected with the second contact terminals 272-2. For example, the fourth contact terminals 281 may be individually brought into contact with the second contact terminals 272-2. The fourth contact terminals 281 may be electrically connected with the connector 289.

According to an embodiment, when the first printed circuit board 260 performs a linear motion in the specified direction (e.g., the Z-axis direction), the second connecting member 270-2 may maintain the flexibility and elasticity thereof. When the first printed circuit board 260 moves, the second connecting member 270-2 may be deformed, but may transfer a signal between the first printed circuit board 260 and the second printed circuit board 280. For example, when the first printed circuit board 260 moves away from the second printed circuit board 280, the first printed circuit board 260, the second connecting member 270-2, and the second printed circuit board 280 may form a "Z" shape (or, an inverted "Z" shape).

Figure 8A:
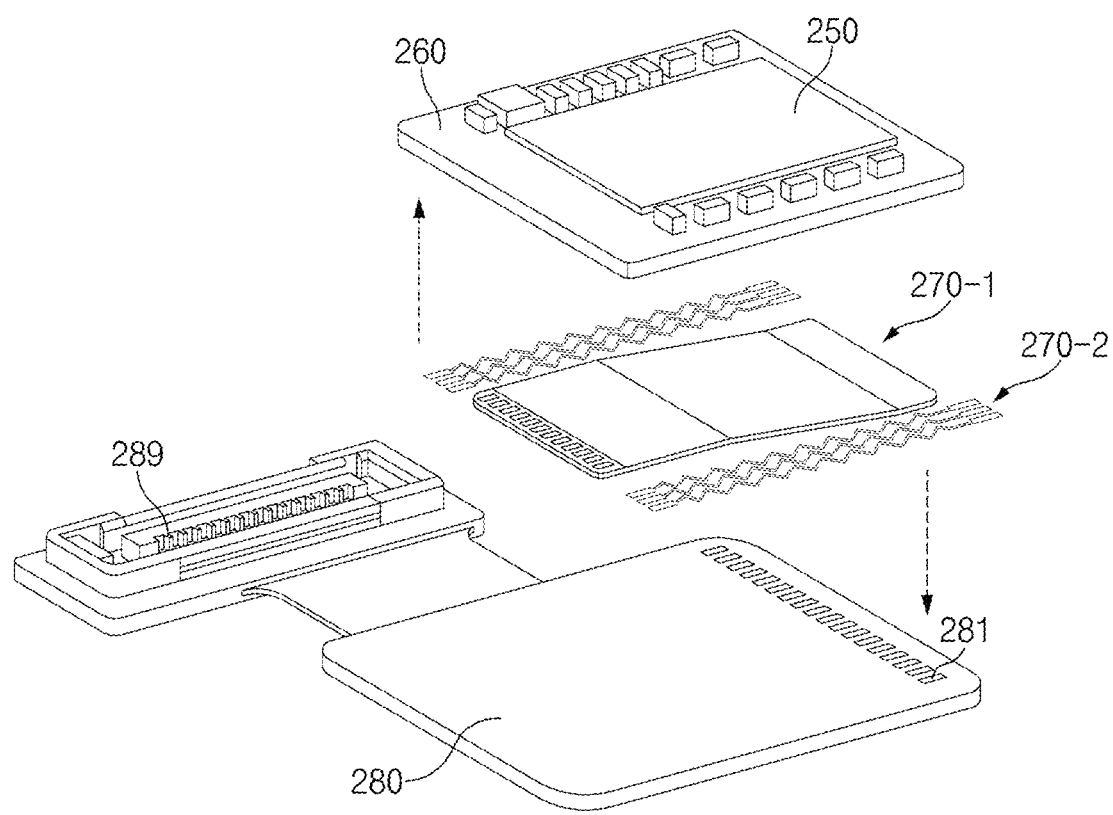
FIG. 8A is a view illustrating a coupling relationship between connecting members and printed circuit boards according to various embodiments, as viewed in one direction.
Figure 8A:
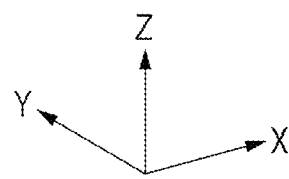
Figure 8B:
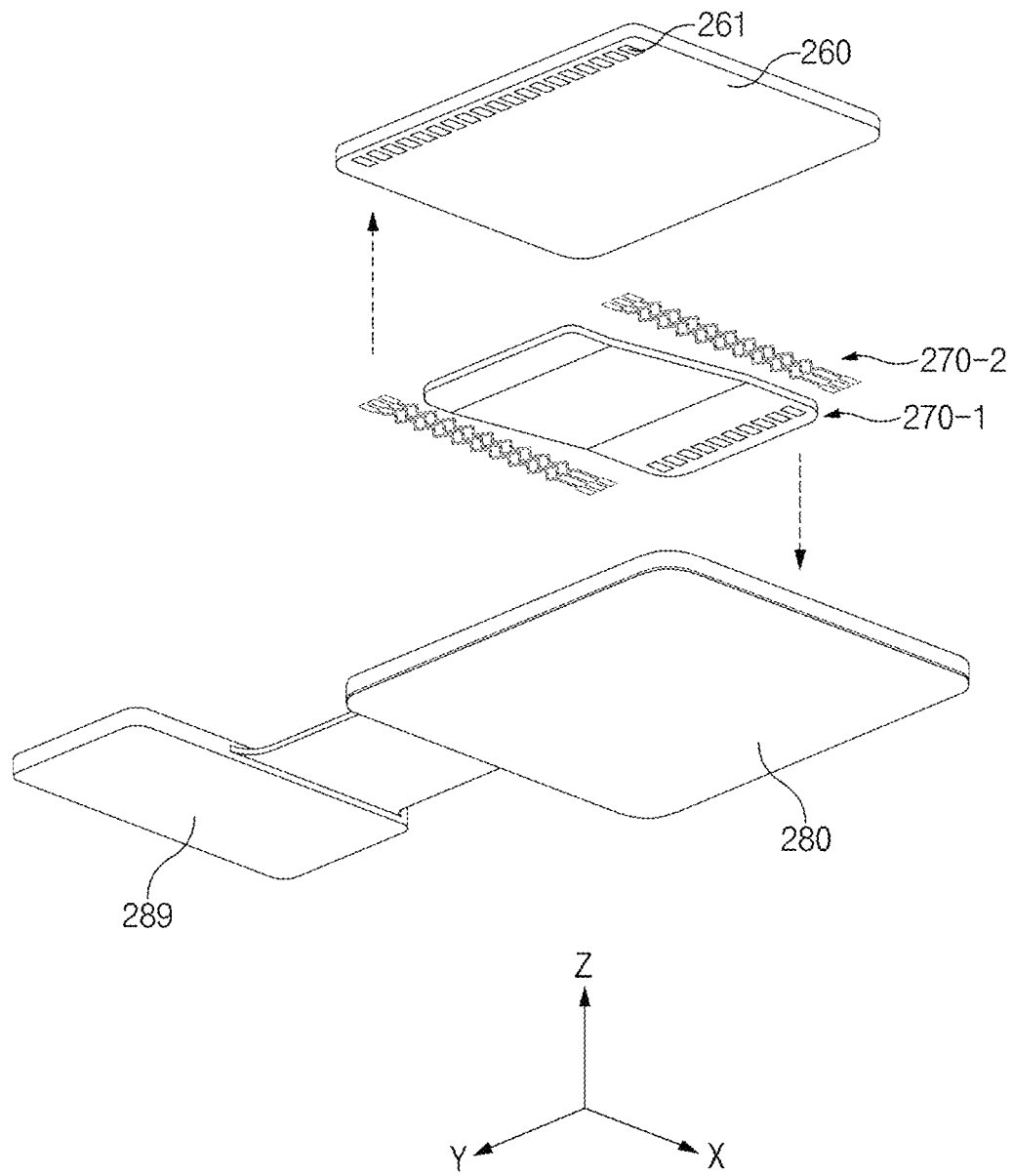
FIG. 8B is a view illustrating the coupling relationship between the connecting members and the printed circuit boards according to the various embodiments, as viewed in a different direction.

FIG. 8A is a view illustrating a coupling relationship between connecting members and printed circuit boards according to various embodiments, as viewed in one direction. FIG. 8B is a view illustrating the coupling relationship between the connecting members and the printed circuit boards according to the various embodiments, as viewed in a different direction.

According to an embodiment, the first printed circuit board 260 and the second printed circuit board 280 may be connected through connecting members that are formed of various materials or that have various shapes. For example, some contact terminals of the first printed circuit board 260 may be connected with corresponding contact terminals of the second printed circuit board 280 through the first connecting member 270-1 (e.g., an FPCB). Other contact terminals of the first printed circuit board 260 may be connected with corresponding contact terminals of the second printed circuit board 280 through the second connecting members 270-2 (e.g., spring structures).

Figure 9:
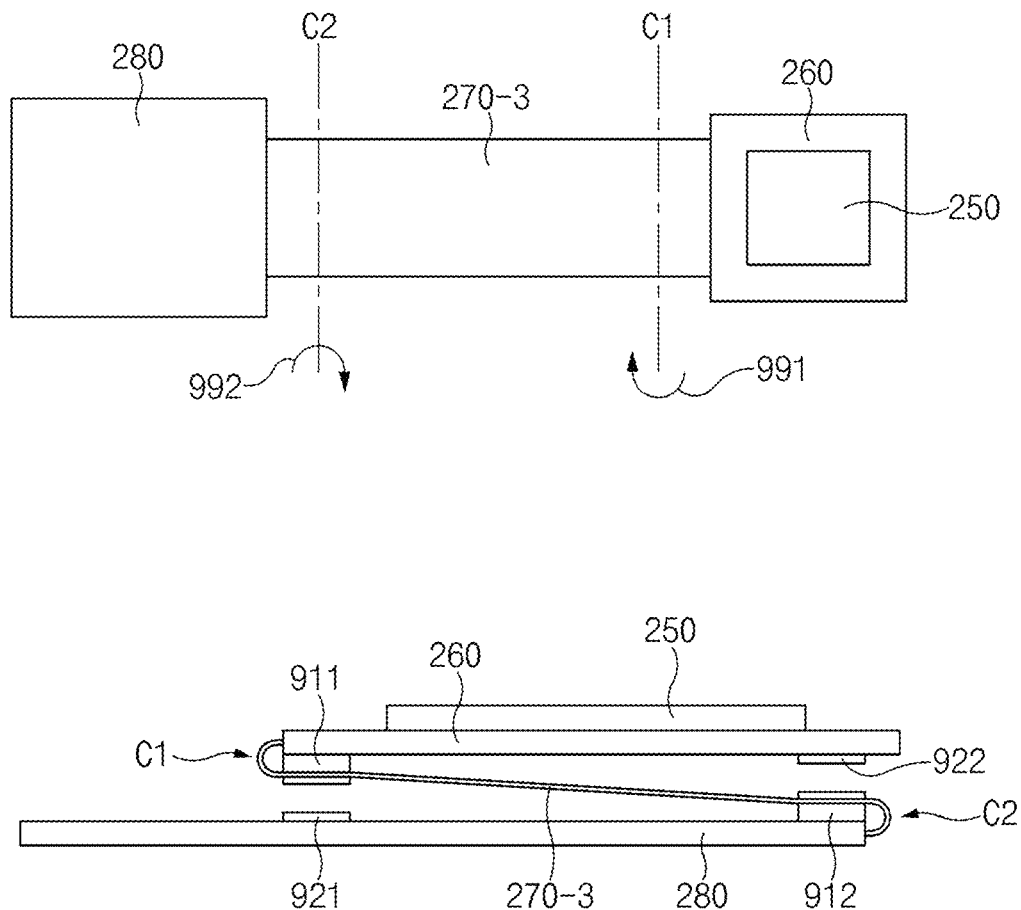
FIG. 9 is a view illustrating a coupling relationship between a connecting member and printed circuit boards according to various embodiments.

FIG. 9 is a view illustrating a coupling relationship between a connecting member and printed circuit boards according to various embodiments.

According to an embodiment, the first printed circuit board 260, a third connecting member 270-3 (e.g., the connecting member 270 of FIG. 2), and the second printed circuit board 280 may be integrally formed with one another. For example, the first printed circuit board 260 and the second printed circuit board 280 may include a plurality of layered structures. Some layers of the first printed circuit board 260 and the second printed circuit board 280 may be simultaneously formed with the third connecting member 270-3. The third connecting member 270-3 may be implemented with an FPCB.

According to an embodiment, the third connecting member 270-3 may be bent at two or more points C1 and C2, and when viewed in the specified direction, at least part of the second printed circuit board 280 may overlap the first printed circuit board 260. For example, the third connecting member 270-3 may be bent at the first point C1 in a first rotational direction 991 such that one surface of the first printed circuit board 260 (e.g., a surface opposite to the surface on which the image sensor 250 is mounted) faces the third connecting member 270-3. The third connecting member 270-3 may be bent at the second point C2 in a second rotational direction 992 such that the third connecting member 270-3 is located between the first printed circuit board 260 and the second printed circuit board 280. This is illustrative, and the point at which the third connecting member 270-3 is bent and the direction in which the third connecting member 270-3 is bent may be variously set.

According to an embodiment, a first fixing member 911 may be disposed (or, formed) on the one surface of the first printed circuit board 260 (e.g., the surface opposite to the surface on which the image sensor 250 is mounted) so as to be adjacent to the first point C1. For example, the first fixing member 911 may allow the curvature of the third connecting member 270-3 at the first point C1 to remain above a specified value. The first fixing member 911 may prevent (or, reduce) a defect in the portion where the third connecting member 270-3 and the first printed circuit board 260 are connected. According to various embodiments, a first shock-absorbing member 921 may be disposed on one surface of the second printed circuit board 280 (e.g., a surface facing the third connecting member 270-3) to correspond to the first fixing member 911. For example, when the first printed circuit board 260 approaches the second printed circuit board 280, the first shock-absorbing member 921 may absorb shock applied to the first point C1.

According to an embodiment, a second fixing member 912 may be disposed (or, formed) on the one surface of the second printed circuit board 280 (e.g., the surface facing the third connecting member 270-3) so as to be adjacent to the second point C2. For example, the second fixing member 912 may allow the curvature of the third connecting member 270-3 at the second point C2 to remain above the specified value. The second fixing member 912 may prevent (or, reduce) a defect in the portion where the third connecting member 270-3 and the second printed circuit board 280 are connected. According to various embodiments, a second shock-absorbing member 922 may be disposed on the one surface of the first printed circuit board 260 (e.g., the surface facing the third connecting member 270-3) to correspond to the second fixing member 912. For example, when the first printed circuit board 260 approaches the second printed circuit board 280, the second shock-absorbing member 922 may absorb shock applied to the second point C2.

Figure 10:
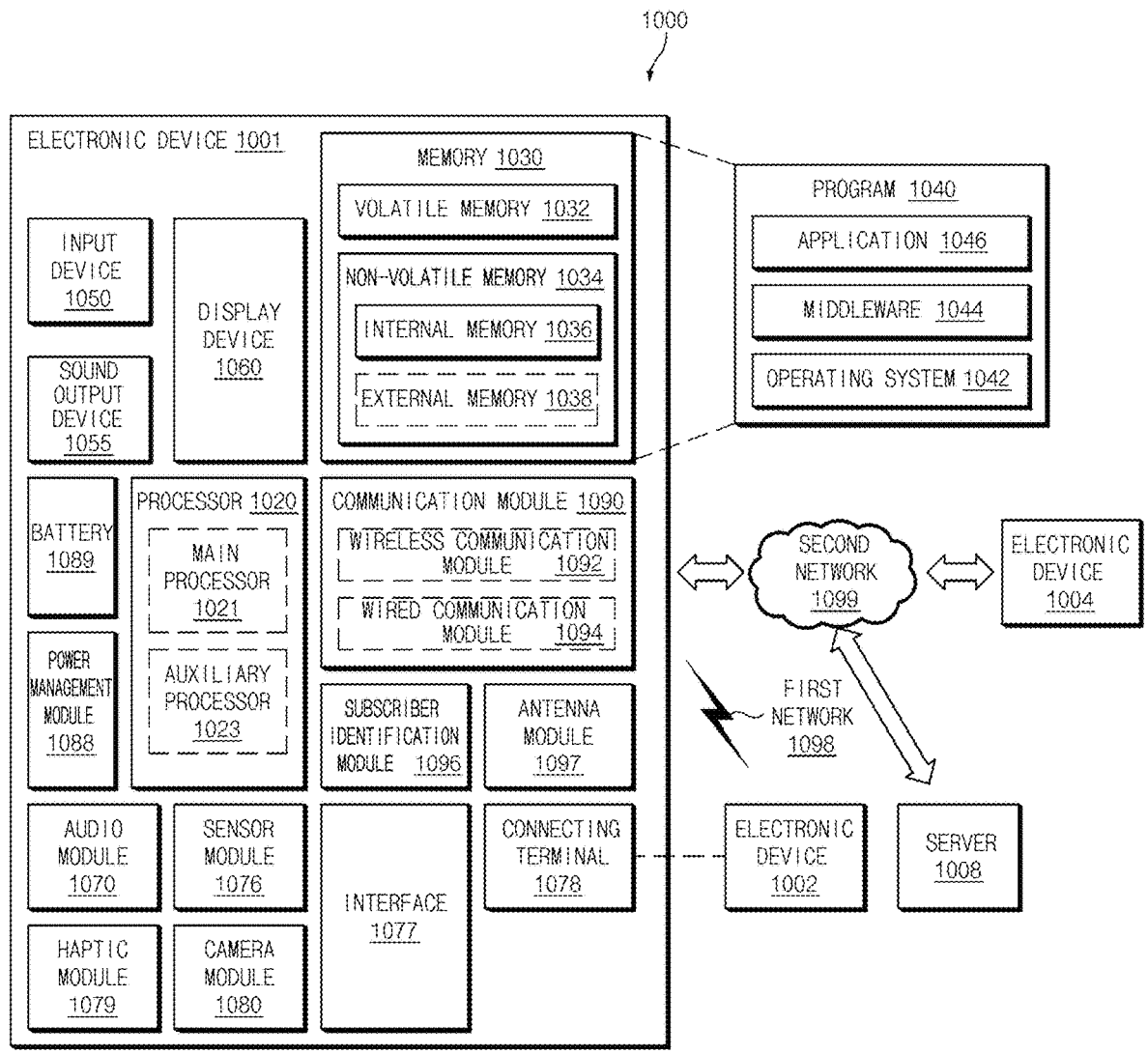
FIG. 10 is a block diagram illustrating an electronic device in a network environment according to various embodiments.

FIG. 10 is a block diagram illustrating an electronic device 1001 in a network environment 1000 according to various embodiments. Referring to FIG. 10, the electronic device 1001 in the network environment 1000 may communicate with an electronic device 1002 via a first network 1098 (e.g., a short-range wireless communication network), or an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, or an antenna module 1097. In some embodiments, at least one (e.g., the display device 1060 or the camera module 1080) of the components may be omitted from the electronic device 1001, or one or more other components may be added in the electronic device 1001. In some embodiments, some of the components may be implemented as single integrated circuitry. For example, the sensor module 1076 (e.g., a fingerprint sensor, an iris sensor, or an illuminance sensor) may be implemented as embedded in the display device 1060 (e.g., a display).

The processor 1020 may execute, for example, software (e.g., a program 1040) to control at least one other component (e.g., a hardware or software component) of the electronic device 1001 coupled with the processor 1020, and may perform various data processing or computation. According to one embodiment, as at least part of the data processing or computation, the processor 1020 may load a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by other component (e.g., the processor 1020) of the electronic device 1001, from the outside (e.g., a user) of the electronic device 1001. The input device 1050 may include, for example, a microphone, a mouse, a keyboard, or a digital pen (e.g., a stylus pen).

The sound output device 1055 may output sound signals to the outside of the electronic device 1001. The sound output device 1055 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. According to an embodiment, the display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. According to an embodiment, the audio module 1070 may obtain the sound via the input device 1050, or output the sound via the sound output device 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to one embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., PCB). According to an embodiment, the antenna module 1097 may include a plurality of antennas. In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to the embodiments of the disclosure, the size of the camera exposure area on the display may be reduced.

In addition, the disclosure may provide various effects that are directly or indirectly recognized.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
    a display including a camera exposure area; and
    a camera module disposed on the camera exposure area, wherein the camera module includes:
        a housing fixed to the camera exposure area;
        a lens housing fixed to the housing, the lens housing including an opening corresponding to the camera exposure area;
        at least one lens disposed in the lens housing, the lens including an optical axis facing toward the camera exposure area;
        a first printed circuit board configured to move in the housing in an optical axis direction of the lens;
        an image sensor that faces the lens and is mounted on one surface of the first printed circuit board;
        a second printed circuit board fixed to the housing and disposed on an opposite side to the image sensor with respect to the first printed circuit board; and
        a connecting member disposed between the first printed circuit board and the second printed circuit board and configured to transfer an electrical signal between the first printed circuit board and the second printed circuit board, wherein the connecting member is deformed as the first printed circuit board moves.

2. The electronic device of claim 1, wherein the connecting member includes:
    first contact terminals disposed on a portion of a first surface of the connecting member, the first surface faces the first printed circuit board; and
    second contact terminals disposed on a portion of a second surface of the connecting member, the second surface faces the second printed circuit board, and
    wherein the first contact terminals are spaced apart from the second contact terminals by a specified distance and are individually connected with the second contact terminals through internal wiring of the connecting member.

3. The electronic device of claim 2, wherein the first printed circuit board includes third contact terminals disposed on a portion of an opposite surface of the first printed circuit board, the opposite surface faces the connecting member, and
    wherein the first contact terminals are individually connected with the third contact terminals.

4. The electronic device of claim 3, wherein the third contact terminals are electrically connected with the image sensor through internal wiring of the first printed circuit board.

5. The electronic device of claim 3, wherein the second printed circuit board includes fourth contact terminals on a portion of one surface thereof, the one surface faces the connecting member, and
    wherein the second contact terminals are individually connected with the fourth contact terminals.

6. The electronic device of claim 5, wherein the camera module further includes a connector, and
    wherein the fourth contact terminals are electrically connected with the connector through internal wiring of the second printed circuit board.

7. The electronic device of claim 1, further comprising:
    a processor operatively connected with the camera module,
    wherein the camera module further includes:
        a carrier coupled to the first printed circuit board;
        a magnetic member coupled to one side surface of the carrier; and
        a coil disposed on an inside surface of the housing, the inside surface faces the magnetic member, and
    wherein the processor is configured to:
        apply a specified signal to the coil to move the magnetic member; and
        move the carrier in the optical axis direction of the lens through the movement of the magnetic member.

8. The electronic device of claim 7, wherein the camera module further includes a Hall sensor configured to measure information about a magnetic force of the magnetic member, and
    wherein the processor is further configured to:
        determine a position of the carrier based on the information about the magnetic force of the magnetic member, the information is received from the Hall sensor; and
        apply the specified signal to the coil for auto focusing, based on the position of the carrier.

9. The electronic device of claim 7, wherein the processor is further configured to apply the specified signal to the coil to move the carrier in a specified section in the optical axis direction of the lens.

10. The electronic device of claim 1, wherein the first printed circuit board, the connecting member, and the second printed circuit board are integrally formed with one another, and
wherein the connecting member includes a flexible printed circuit board integrally formed with a partial layer of the first printed circuit board and a partial layer of the second printed circuit board.

11. The electronic device of claim 10, wherein:
the connecting member is bent at a first point such that a surface opposite to the one surface of the first printed circuit board on which the image sensor is mounted faces the connecting member, and
the connecting member is bent at a second point such that one surface of the second printed circuit board faces the connecting member.

12. An electronic device comprising:
a display including a camera exposure area;
a camera module disposed on the camera exposure area; and
a processor operatively connected with the display and the camera module,
wherein the camera module includes:
at least one lens including an optical axis corresponding to a center of the camera exposure area;
a first printed circuit board configured to linearly move in an optical axis direction of the lens;
an image sensor disposed between the lens and the first printed circuit board and electrically connected with the first printed circuit board;
a second printed circuit board disposed on an opposite side to the image sensor with respect to the first printed circuit board and electrically connected with the processor; and
a connecting member configured to transfer an electrical signal between the first printed circuit board and the second printed circuit board, the connecting member being deformed as the first printed circuit board moves, and
wherein the processor is configured to move the first printed circuit board and the image sensor for auto focusing of the image sensor.

13. The electronic device of claim 12, wherein the connecting member includes a plurality of spring structures, and wherein each of the plurality of spring structures includes a first contact terminal, a second contact terminal, and a spring body configured to electrically connect the first contact terminal and the second contact terminal.

14. The electronic device of claim 13, wherein the spring body is flexibly and elastically deformed as the first printed circuit board moves.

15. The electronic device of claim 13, wherein the first printed circuit board includes third contact terminals disposed on a portion of one surface of the first printed circuit board, the one surface faces the connecting member, and
wherein the first contact terminal is electrically connected with one of the third contact terminals.

16. The electronic device of claim 15, wherein the third contact terminals are electrically connected with the image sensor through internal wiring of the first printed circuit board.

17. The electronic device of claim 13, wherein the second printed circuit board includes fourth contact terminals on a portion of one surface thereof, the one surface faces the connecting member, and
wherein the second contact terminal is electrically connected with one of the fourth contact terminals.

18. The electronic device of claim 17, wherein the camera module further includes a connector operatively connected with the processor, and
wherein the fourth contact terminals are electrically connected with the connector through internal wiring of the second printed circuit board.

19. The electronic device of claim 12, wherein the connecting member includes:
a flexible printed circuit board configured to electrically connect some contact terminals of the first printed circuit board and some contact terminals of the second printed circuit board; and
at least one spring structure configured to electrically connect other contact terminals of the first printed circuit board and other contact terminals of the second printed circuit board.

20. The electronic device of claim 12, wherein the display includes a through-hole or an optical hole corresponding to the camera exposure area, and
wherein the lens is fixed in the through-hole or the optical hole.

* * * * *